(12) United States Patent
LaPlante et al.

(10) Patent No.: US 12,305,976 B2
(45) Date of Patent: May 20, 2025

(54) OPTICAL SYSTEM USING ENHANCED STATIC FRINGE CAPTURE

(71) Applicant: BMV Optical Technologies Inc., Ottawa (CA)

(72) Inventors: Curtis Blake LaPlante, Ottawa (CA); Bruno Machado Trindade, Kanata (CA); Eranga Madujith Ukwatta, Toronto (CA)

(*) Notice: Subject to any disclaimer, the term of this patent is extended or adjusted under 35 U.S.C. 154(b) by 221 days.

(21) Appl. No.: 17/999,859

(22) PCT Filed: Jun. 14, 2021

(86) PCT No.: PCT/CA2021/050804
§ 371 (c)(1),
(2) Date: Nov. 24, 2022

(87) PCT Pub. No.: WO2021/253113
PCT Pub. Date: Dec. 23, 2021

(65) Prior Publication Data
US 2023/0213334 A1    Jul. 6, 2023

Related U.S. Application Data

(60) Provisional application No. 63/039,096, filed on Jun. 15, 2020.

(51) Int. Cl.
*G01B 11/30* (2006.01)
*G01B 9/02* (2022.01)
(Continued)

(52) U.S. Cl.
CPC .......... *G01B 11/30* (2013.01); *G01B 9/02049* (2013.01); *G01B 9/02056* (2013.01); *G01B 9/02072* (2013.04)

(58) Field of Classification Search
CPC . G01N 21/45; Y10S 436/807; Y10S 435/808; G01B 11/2441; G01B 9/02057;
(Continued)

(56) References Cited

U.S. PATENT DOCUMENTS 4,169,980 A * 10/1979 Zanoni ................ G01B 11/022
356/512
5,004,346 A    4/1991 Kuechel
(Continued)

OTHER PUBLICATIONS

Broistedt, Hagen, et al. "Random-phase-shift Fizeau interferometer." Applied optics 50.36 (2011): 6564-6575 (Year: 2011).*
(Continued)

*Primary Examiner* — Tarifur R Chowdhury
*Assistant Examiner* — Roberto Fabian, Jr.

(57) ABSTRACT

A background subtraction method and tilt stage device for eliminating contaminated or spurious interference patterns by reducing retrace errors. An optical reference surface secured in a pivoting mount coupled to a tilt actuator is configured to angularly displace the pivoting mount and optical reference surface. A microcontroller coupled to the tilt actuator controls the tilt displacement of the tilt actuator providing a plurality of wavefront measurements of the reference surface at a plurality of angles to provide a system and method for background measurement.

18 Claims, 12 Drawing Sheets

(51) Int. Cl.
*G01B 9/02055* (2022.01)
*G01B 9/02056* (2022.01)

(58) Field of Classification Search
CPC ............... G01B 11/30; G01B 9/02049; G01B 9/02056; G01B 9/02072; G01B 9/02032; G01J 3/4532; G01J 9/02; G01M 11/005; G02B 26/101; G02B 7/1827
See application file for complete search history.

(56) References Cited

U.S. PATENT DOCUMENTS

| | | | |
|---|---|---|---|
| 5,392,117 A | | 2/1995 | Belleville et al. |
| 5,432,606 A | * | 7/1995 | Noguchi ............ G01B 9/02032 356/514 |
| 5,680,214 A | * | 10/1997 | Lamb, Jr. ............ G02B 7/1827 356/514 |
| 5,933,236 A | | 8/1999 | Sommargren |
| 6,650,421 B2 | | 11/2003 | Magome |
| 8,045,175 B2 | * | 10/2011 | De Groot ........... G01B 9/02057 356/497 |
| 8,269,981 B1 | | 9/2012 | Doerband et al. |
| 8,489,359 B2 | | 7/2013 | McDonnell et al. |
| 9,234,739 B2 | | 1/2016 | Sykora et al. |
| 9,435,640 B2 | | 9/2016 | Dresel |
| 10,330,461 B2 | * | 6/2019 | Robledo ............ G01B 9/02072 |
| 10,337,850 B2 | | 7/2019 | Hetzler et al. |
| 10,444,004 B2 | | 10/2019 | Kawasaki |
| 10,527,403 B2 | | 1/2020 | Hetzler |
| 2005/0046864 A1 | | 3/2005 | Millerd et al. |
| 2007/0058174 A1 | * | 3/2007 | Hill ........................ G01J 9/02 356/512 |
| 2015/0198438 A1 | | 7/2015 | Hetzler |
| 2018/0017372 A1 | * | 1/2018 | Conley ............ G01B 9/02002 |

OTHER PUBLICATIONS

Liu, Qian, et al. "Vibration-resistant phase retrieval method with contrast compensation for phase-shifting interferometry." Journal of Optics 19.4 (2017): 045702 (Year: 2017).*

Garoi, Florin, Paul Schiopu, and Dan Apostol. "Spatial domain filtering of speckle interferograms depicting vibration modes." University"Politehnica" of Bucharest Scientific Bulletin, Series A: Applied Mathematics and Physics 74.1 (2012): 115-124.*

NASA Guideline for Use of Fizeau Interferometer in Optical Testing, Guideline No. GT-TE-2404, 11pp.https://extapps.ksc.nasa.gov/Reliability/Documents/Preferred_Practices/2404.pdf.

* cited by examiner

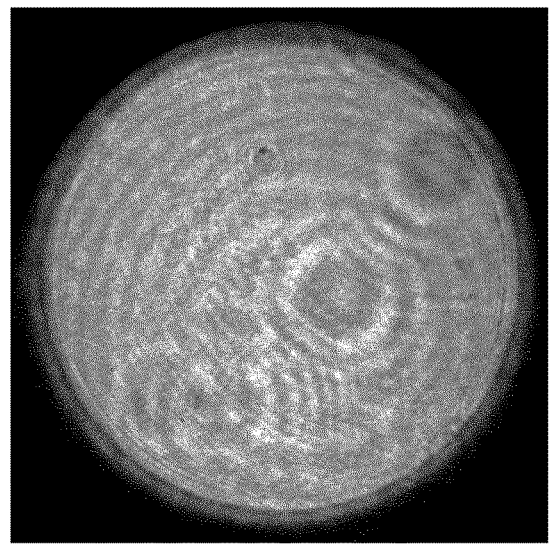
Figure 7
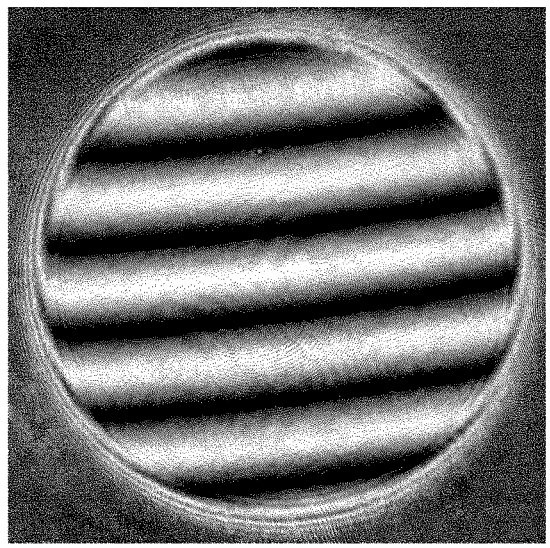 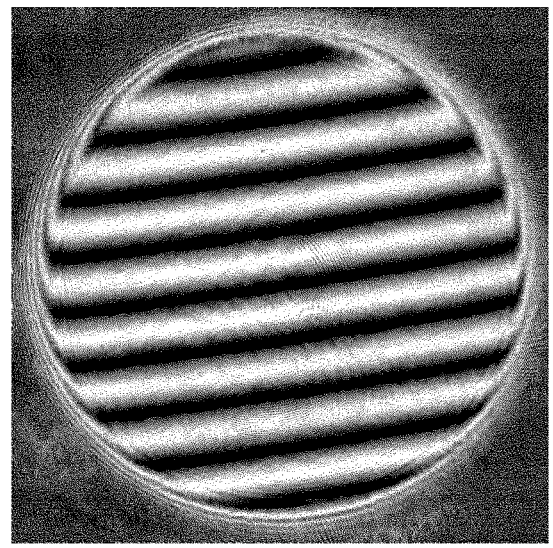
Figure 8A　　　　　　　　　　Figure 8B

| 20thFS Surface | System | PV | RMS | Power | Tilt | Tilt Angle | Focus | Astigm. | Ast. Angle | Coma | Coma Angle | Spherical |
|---|---|---|---|---|---|---|---|---|---|---|---|---|
| | BMV | 0.055 | 0.005 | -0.005 | 4.958 | -86 | 0.008 | 0.021 | -37 | 0.015 | -4 | -0.013 |
| | PSFI with Tilt (Trim Off) | 0.055 | 0.005 | -0.005 | 4.572 | -90 | 0.005 | 0.014 | -34 | 0.019 | 4 | -0.010 |
| | PSFI with Tilt (Trim On) | 0.055 | 0.005 | -0.005 | 4.823 | -86 | 0.003 | 0.014 | -33 | 0.019 | 2 | -0.008 |
| | PSFI Null Tilt (Trim Off) | 0.041 | 0.004 | -0.003 | 0.197 | -81 | 0.006 | 0.012 | -36 | 0.017 | 0 | -0.009 |
| No Power | BMV – PSFI (With Tilt & Trim Off) | 0.000 | 0.000 | 0.000 | 0.386 | 4 | 0.003 | 0.007 | -3 | -0.004 | -8 | -0.003 |
| | BMV – PSFI (With Tilt & Trim On) | 0.000 | 0.000 | 0.000 | 0.135 | 0 | 0.005 | 0.007 | -4 | -0.004 | -6 | -0.005 |
| | BMV – PSFI (Null & Trim Off) | 0.014 | 0.001 | -0.002 | | | 0.002 | 0.009 | -1 | -0.002 | -4 | -0.004 |
| | Min (BMV - PSFI) | 0.000 | 0.000 | 0.000 | 0.135 | 0 | 0.002 | 0.007 | 1 | 0.002 | 4 | 0.003 |
| | Max (BMV - PSFI) | 0.014 | 0.001 | 0.002 | 0.386 | 4 | 0.005 | 0.009 | 4 | 0.004 | 8 | 0.005 |
| | PSFI with Tilt (Trim Off – Null) | 0.014 | 0.001 | -0.002 | | | -0.001 | 0.002 | 2 | 0.002 | 4 | -0.001 |
| | BMV | 0.057 | 0.005 | -0.005 | 4.958 | -86 | 0.008 | 0.021 | -37 | 0.015 | -4 | -0.013 |
| | PSFI with Tilt (Trim Off) | 0.050 | 0.005 | -0.005 | 4.507 | -91 | 0.004 | 0.014 | -34 | 0.019 | 3 | -0.009 |
| | PSFI with Tilt (Trim On) | 0.054 | 0.005 | -0.005 | 4.641 | -89 | 0.005 | 0.014 | -34 | 0.019 | 5 | -0.010 |
| | PSFI Null Tilt (Trim Off) | 0.044 | 0.004 | -0.003 | 0.111 | -110 | 0.008 | 0.013 | -37 | 0.017 | 4 | -0.011 |
| Power | BMV – PSFI (With Tilt & Trim Off) | 0.007 | 0.000 | 0.000 | 0.451 | 5 | 0.004 | 0.007 | -3 | -0.004 | -7 | -0.004 |
| | BMV – PSFI (With Tilt & Trim On) | 0.003 | 0.000 | 0.000 | 0.317 | 3 | 0.003 | 0.007 | -3 | -0.004 | -9 | -0.003 |
| | BMV – PSFI (Null & Trim Off) | 0.013 | 0.001 | -0.002 | | | 0.000 | 0.008 | 0 | -0.002 | -8 | -0.002 |
| | Min (BMV - PSFI) | 0.003 | 0.000 | 0.000 | 0.317 | 3 | 0.000 | 0.007 | 0 | 0.002 | 7 | 0.002 |
| | Max (BMV - PSFI) | 0.013 | 0.001 | 0.002 | 0.451 | 5 | 0.004 | 0.008 | 3 | 0.004 | 9 | 0.004 |
| | PSFI with Tilt (Trim Off – Null) | 0.006 | 0.001 | -0.002 | | | -0.004 | 0.001 | 3 | 0.002 | -1 | 0.002 |

Figure 12A

| G4 Surface | System | PV | RMS | Power | Tilt | Tilt Angle | Focus | Astigm. | Ast. Angle | Coma | Coma Angle | Spherical |
|---|---|---|---|---|---|---|---|---|---|---|---|---|
| | BMV | 0.272 | 0.027 | -1.348 | 4.483 | -91 | -1.346 | 0.103 | 44 | 0.065 | -43 | 0.004 |
| | PSFI with Tilt (Trim Off) | 0.272 | 0.027 | -1.345 | 4.490 | -90 | -1.338 | 0.101 | 45 | 0.062 | -47 | -0.008 |
| | PSFI with Tilt (Trim On) | 0.271 | 0.027 | -1.345 | 4.477 | -90 | -1.337 | 0.100 | 45 | 0.063 | -46 | -0.008 |
| | PSFI Null Tilt (Trim Off) | 0.268 | 0.026 | -1.344 | 0.122 | -44 | -1.335 | 0.098 | 46 | 0.061 | -43 | -0.009 |
| No Power | BMV – PSFI (With Tilt & Trim Off) | 0.000 | 0.000 | -0.003 | -0.007 | -1 | -0.008 | 0.002 | -1 | 0.003 | 4 | 0.012 |
| | BMV – PSFI (With Tilt & Trim On) | 0.001 | 0.000 | -0.003 | 0.006 | -1 | -0.009 | 0.003 | -1 | 0.002 | 3 | 0.012 |
| | BMV – PSFI (Null & Trim Off) | 0.004 | 0.001 | -0.004 | | | -0.011 | 0.005 | -2 | 0.004 | 0 | 0.013 |
| | Min (BMV - PSFI) | 0.000 | 0.000 | 0.003 | 0.006 | 1 | 0.008 | 0.002 | 1 | 0.002 | 0 | 0.012 |
| | Max (BMV - PSFI) | 0.004 | 0.001 | 0.004 | 0.007 | 1 | 0.011 | 0.005 | 2 | 0.004 | 4 | 0.013 |
| | PSFI with Tilt (Trim Off – Null) | 0.004 | 0.001 | -0.001 | | | -0.003 | 0.003 | -1 | 0.001 | -4 | 0.001 |
| | BMV | 1.504 | 0.388 | -1.348 | 4.483 | -91 | -1.346 | 0.103 | 44 | 0.065 | -43 | 0.004 |
| | PSFI with Tilt (Trim Off) | 1.545 | 0.388 | -1.345 | 4.511 | -90 | -1.388 | 0.100 | 45 | 0.063 | -46 | -0.007 |
| | PSFI with Tilt (Trim On) | 1.541 | 0.388 | -1.345 | 4.466 | -90 | -1.337 | 0.101 | 45 | 0.064 | -46 | -0.008 |
| | PSFI Null Tilt (Trim Off) | 1.541 | 0.388 | -1.343 | 0.140 | -66 | -1.335 | 0.099 | 46 | 0.061 | -44 | -0.008 |
| Power | BMV – PSFI (With Tilt & Trim Off) | -0.041 | 0.000 | -0.003 | -0.028 | -1 | 0.042 | 0.003 | -1 | 0.002 | 3 | 0.011 |
| | BMV – PSFI (With Tilt & Trim On) | -0.037 | 0.000 | -0.003 | 0.017 | -1 | -0.009 | 0.002 | -1 | 0.001 | 3 | 0.012 |
| | BMV – PSFI (Null & Trim Off) | -0.037 | 0.000 | -0.005 | | | -0.011 | 0.004 | -2 | 0.004 | 1 | 0.012 |
| | Min (BMV - PSFI) | 0.037 | 0.000 | 0.003 | 0.017 | 1 | 0.009 | 0.002 | 1 | 0.001 | 1 | 0.011 |
| | Max (BMV - PSFI) | 0.041 | 0.000 | 0.005 | 0.028 | 1 | 0.042 | 0.004 | 2 | 0.004 | 3 | 0.012 |
| | PSFI with Tilt (Trim Off – Null) | 0.004 | 0.000 | -0.002 | | | -0.053 | 0.001 | -1 | 0.002 | -2 | 0.001 |

Figure 12B

OPTICAL SYSTEM USING ENHANCED STATIC FRINGE CAPTURE

CROSS-REFERENCE TO RELATED APPLICATIONS

This application claims priority to United States provisional patent application U.S. 63/039,096 filed 15 Jun. 2020, and is a United States National Stage application under 35 U.S.C. 371 of PCT Application No. PCT/CA2021/050804, filed on 14 Jun. 2021, both of which are hereby incorporated by reference herein in their entirety.

FIELD OF THE INVENTION

The present invention pertains to a non-contact surface profile measuring device for measuring the surface irregularity of an optical element such as a lens or a window. The invention also relates to a system and method for optical surface analysis and calibration using static fringe capture and measurement for interferometrically determining a shape of a surface of an optical element.

BACKGROUND

Optical surface imperfections and defects can normally be visually observed on the surface of an optical component. These imperfections include scratches, pits, sleeks or tiny scratches, bubbles, edge chips, stains, and coating blemishes. These defects can be very small and do not affect system performance, however in some cases for more demanding applications these defects can result in light scattering, undesired diffraction patterns, loss of contrast, and stray light. Optical surface irregularity is another form of surface imperfection that cannot be visually observed on the surface of an optical component without highly specialized instrumentation can have a significant impact on the optical system as a whole. This irregularity impacts the transmitted or reflected wavefront of an optical surface by introducing a variety of optical aberrations including but not limited to spherical aberration and comatic aberration. Combined, these optical surface imperfections can stack up to degrade the overall optical system performance even if all other optical component specifications have been met.

Interferometers can be used to measure the surface profile of a test optical surface by combining a test wavefront reflected from the test surface with a reference wavefront reflected from a reference surface to form an optical interference pattern, where spatial variations in the optical interference pattern correspond to phase differences between the combined test and reference wavefronts caused by variations in the profile of the test surface relative to the reference surface. A Fizeau interferometer can be used for characterizing an optical surface using phase shifting by mechanical longitudinal translation of the reference surface or by wavelength tuning during which time a computer captures successive frames of an interference pattern at a detector for later analysis. In performing phase shifting optical surface measurement, a complex, high precision, and calibrated displacement stage is generally used for shifting the reference surface toward and away from the light source. However, even minor environmental disturbances such as system or component vibration and air turbulence can interfere with the phase shifting and can introduce retrace errors, which occur when the surface being tested is not perfectly spherical and/or is not positioned exactly concentric with the reference surface, resulting in measurement inaccuracy. A retrace error refers to the result of the beam taking an aberrated path back through the interferometer, such as when two interfering beams, i.e. the measurement beam and the reference beam, depart from a common imaging path. As a result, additional and differing phase contributions due to system design or spatially local imperfections can be accumulated in the traversed optical components. Interferometer retrace errors are usually well corrected for when the cavity is nulled, however when the cavity alignment deviates, systematic measurement errors can be easily introduced. The magnitude and type of error is dependent on the cavity length and aperture, the magnitude and type of misalignment, and the degree of aberration correction in the optical design of the interferometer and reference surface accessories. Long range retrace errors tend to come from misalignment issues within the interferometer, whereas short range retrace errors tend to come from optical surface defects.

One way to reduce the retrace error resulting from movement of the displacement stage is by increasing the number of acquired images, which requires a longer data collection time. Lengthening the test time, however, can result in a gradual shift of the position of the reference surface and/or test surface due to vibrations and temperature changes in the measurement environment. In addition, devices that provide high precision movement of the displacement stage can be expensive, sensitive, challenging to calibrate, and inaccurate over time.

In one example, U.S. Pat. No. 8,269,981 to Doerband et al. provides a method of measuring the deviation of an optical test surface from a target shape by directing an incoming beam of electromagnetic radiation onto a test surface to generate a measuring beam that has interacted with the test surface causing the ray that has interacted with the test surface to pass through an interferometer on a deviated path, performing an interferometric measurement by superimposing a reference beam with the measuring beam to determine a wavefront deviation of the measuring beam from the reference beam, determining a retrace error in the wavefront deviation, and correcting the measured wavefront deviation by eliminating the retrace error. Doerband et al. uses a multi-stage total system error removal method for both long and short range retrace errors by the introduction of an additional reference surface to aberrate the wavefront.

As described in U.S. Pat. No. 8,902,431 to Liesener et al., phase-shifting interferometry (PSI) can also be used to determine the phase differences and the corresponding surface profile of an optical test surface. In Liesener et al., the test surface is measured relative to a reference surface which is either assumed to be perfect, or whose characterization is known within the tolerances of the measurement. The optical interference pattern is then recorded for each of multiple phase-shifts between the reference and test wavefronts to produce a series of optical interference patterns. The optical interference patterns define a series of intensity values for each spatial location of the pattern, wherein each series of intensity values has a sinusoidal dependence on the phase-shifts with a phase-offset equal to the phase difference between the combined test and reference wavefronts at that spatial location. Using a phase-shifting algorithm, the phase-offset for each spatial location is extracted from the sinusoidal dependence of the intensity values to provide a surface characterization or test surface profile relative to the reference surface. In PSI, the phase-shifts are produced by changing the optical path length from the measurement surface to the interferometer relative to the optical path length from the reference surface to the interferometer by moving the test surface backwards and forwards relative to the measurement surface.

In another example, U.S. Pat. No. 9,234,739 to Syorka et al. describes an in-situ calibration of an interferometer for post-measurement calibration by making a sequence of phase measurements of a test object with each of the measurements having the same carrier fringe frequency with at least some of the measurements made at three or more different orientations of carrier fringes, and determining information about the test object based on at least some of the phase measurements. Syorka et al. describe tilt and pixel-level analysis of multiple images, however the measurements require the same carrier fringe frequency, which means that the same number of fringes need to be taken in each image. In particular, tilt control is used to move the reflected surface alignment from null (zero tilt between surfaces) to a specific amount of tilt while rotating symmetrically around the null position. This would have to be fairly precise which is why the same carrier frequency is a requirement for each measurement.

Static fringe analysis uses uncalibrated tilt to induce tilt aberration for the purpose of reconstructing the surface profile of an optical component by allowing wave interference to occur between the ideal reference surface and the surface to be tested. In industry standard methods of optical system calibration and measurement, full system error measurements are required to provide a background subtraction method to eliminate contaminating or spurious patterns created by the system alignment or system environment. These measurements only remain valid if the system measurement settings do not change between measurements including the camera zoom and optical focus settings. As such there remains a need for a robust and accurate method of optical surface analysis that reduces system short range retrace errors.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a robust method and device for optical surface analysis of an optical element that reduces system short range retrace errors. Another object of the present invention is to provide a system, device, and method for interferometrically determining a shape of a surface of an optical element using static fringe capture.

In an aspect there is provided an interferometer system comprising: a light source for providing an input wave; a beam splitter for splitting the input wave; a reference surface for receiving the split input wave; a tilt actuator coupled to the reference surface configured to provide an angular displacement of the reference surface; a microcontroller coupled to the tilt actuator for controlling the tilt frequency and tilt displacement of the tilt actuator; a detector configured to collect interferometry data from the reference surface; and a data processing apparatus coupled to the detector for processing interferometry data collected by the detector.

In an embodiment, the tilt actuator is a piezoelectric actuator.

In another embodiment, the microcontroller controls a tilt frequency of the tilt actuator.

In another embodiment, the tilt frequency is between about 0.1 Hz and 10 Hz, or between about 0.1 Hz and 240 Hz.

In another embodiment, the angular displacement of the reference surface is about 1-micron for every 1-inch of diameter of optical aperture of the optical reference surface.

In another embodiment, the interferometer system is a Fizeau interferometer.

In another embodiment, the system further comprises a pivoting mount for releasably engaging the reference surface.

In another aspect there is provided a method of background subtraction in an interferometry measurement comprising: providing an input wave from a light source; splitting the input wave with a beam splitter; receiving the split input wave at a reference surface; tilting the reference surface relative to the input wave; obtaining a plurality of wavefront measurements of the reference surface at a plurality of angles at a detector, the wavefront measurements comprising a fringe pattern; and overlaying the plurality of wavefront measurements to subtract out short retrace errors and provide a system background measurement.

In an embodiment, the reference surface is tilted at a tilt frequency to angularly oscillate the reference surface.

In another embodiment, the method further comprises controlling the tilt angle of the tilt actuator using a microcontroller.

In another embodiment, the tilt frequency is between about 0.1 Hz and 10240 Hz.

In an embodiment, the method further comprises locating fringe centres in the fringe pattern wavefront measurements.

In another embodiment, the angular displacement of the reference surface is about 1-micron for every 1-inch of diameter of optical aperture of the optical reference surface.

In another embodiment, the method further comprises simultaneously directing the split input wave at a surface-under-test.

In another embodiment, the method further comprises performing a three-dimensional surface plot construction of the surface-under-test.

In another embodiment, overlaying the plurality of wavefront measurements comprises processing the fringe pattern of each wavefront measurement to locate and mark the centre of the bright and dark fringes.

In an embodiment, the method further comprises applying a blur filter to the plurality of wavefront measurements.

In another embodiment, obtaining a plurality of wavefront measurements of the reference surface further comprises applying an aperture mask to identify the area of measurement.

In another aspect there is provided a tilt stage for an interferometry system comprising: a housing for securing the tilt stage to the interferometer system; a pivoting mount coupled to the housing; an optical reference surface secured in the pivoting mount; a tilt actuator coupled to the pivoting mount configured to angularly displace the pivoting mount and optical reference surface at a tilt frequency; and a microcontroller coupled to the tilt actuator for controlling the tilt displacement of the tilt actuator.

In an embodiment, the tilt actuator is a piezoelectric actuator.

In another embodiment, the optical reference surface is releasably secured in the pivoting mount.

In another embodiment, the microcontroller controls a tilt frequency of the tilt actuator.

BRIEF DESCRIPTION OF THE FIGURES

For a better understanding of the present invention, as well as other aspects and further features thereof, reference is made to the following description which is to be used in conjunction with the accompanying drawings, where:

FIG. 6D is an example interferogram recorded with the tilt actuator on;

FIG. 7 is an image of the background of a reference surface;

FIG. 8A is an example interferogram recorded with the tilt actuator off and background subtracted and blurred;

FIG. 8B is an example interferogram recorded with the tilt actuator on and background subtracted and blurred;

FIG. 12A shows the comparative results from Example 1 of a 20 thFS Surface using a Phase-Shifting Fizeau Interferometer (PSFI) compared to the present static fringe capture system using the static fringe analysis images; and FIG. 12B shows the comparative results from Example 1 of a G4 Surface using a Phase-Shifting Fizeau Interferometer (PSFI) compared to the present static fringe capture system using the static fringe analysis images.

DETAILED DESCRIPTION OF THE INVENTION

Figure 1:
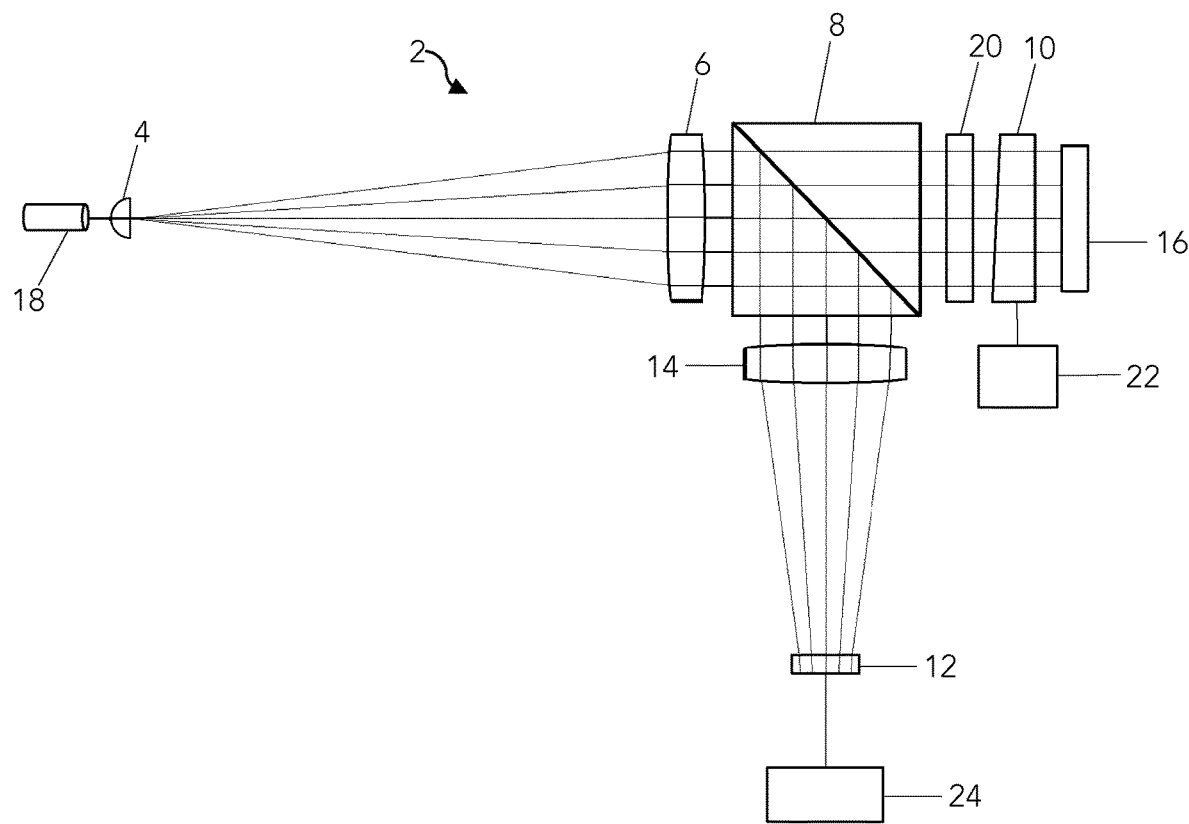
FIG. 1 is a system diagram for a Fizeau interferometer with tilt stage.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "retrace error" as used herein refers to a measurement inaccuracy caused by phase aberration when two interfering beams depart from a common imaging path resulting in accumulated differing phase contributions. Retrace error can be caused by, for example, system design, environmental interference, or spatially local imperfections in the traversed optical components.

The term "about" as used herein means greater or lesser than the value or range of values stated by 10 percent. Each value or range of values preceded by the term "about" is also intended to encompass the embodiment of the stated absolute value or range of values.

Herein is described an optical system and method optical surface measurement in an interferometer using static fringe capture and analysis methodologies. Also described herein is a robust and accurate method of optical surface analysis with angular movement of the test surface or reference surface to correct for background noise caused by misalignment and system sensitivity of the interferometer. The present system can be used to eliminate short range retrace errors in real-time before or during surface measurement such that these short range retrace errors can be subtracted from data capture and provides a methodology to remove short range retrace errors in real-time with each measurement. Short range retrace errors generally arise from optical surface aberrations or irregularities and long range retrace errors arise from misalignment issues with the interferometer. By analysing and removing the system background noise from the data collection prior to optical surface measurement and interrogation, a characterization of surface defects resulting from the optical character of the test surface, also referred to herein as the surface-under-test, can be ascertained in the absence of background noise. The present system and method can be used on interferometry systems, for example, Fizeau interferometer systems and phase-shifting interferometer systems.

In contrast to other known methods, the present system interrogates the surface-under-test by oscillating the interference fringes in the image capture using a tilt actuator to remove the system wavefront and acquire and subtract out the background of the system during image capture. A processed image with the short range retrace errors substantially removed can then be obtained from the measurement by phasing out the short range retrace error wavefronts. Eliminating or minimizing the standard full system measurements with controlled and predictable movement of the test surface or reference surface can provide a sufficiently accurate background and also a more efficient and robust surface interrogation interferometry system and method. The tilt control further does not need to be precise at all, can use open loop control, and the system can use an arbitrary number of fringes for each measurement. As long as the fringes are being displaced this method will still work. The tilt frequency, or frequency at which the tilt actuator operates, at which the present system can operate can vary widely, provided that a sufficient amount of fringe displacement can occur within the capture criteria of the camera. At the lower frequency end, the tilt frequency should be sufficiently fast such that the angle of the tilt actuator is changed between image captures. By contrast, higher tilt frequencies may not allow for the camera to capture enough frames within the oscillation period of the tilt stage. Preferably, the tilt frequency can range between about 0.1 Hz and 10 Hz, or between about 0.1 Hz and 240 Hz. The present tilt actuation method increases or decreases the number of fringes to change their placement, which can provide real-time, per measurement, background subtraction, as the conditions for capturing images can vary substantially between measurements without any deleterious effects. The background can then be captured using a pixel-level background image averaging method generating a high-resolution background image. Additionally, due to the fast exposure speed of the camera the effect of environmental disturbance on data capture is also minimized, resulting in a system that is substantially unaffected by vibration and air turbulence during measurement. Thus, by subtracting out short range retrace errors during data capture instead of using industry standard methods to subtract this error out later, the present method saves both time and data analysis intensity compared to known methods.

Interferometer technologies benefit from the high spatial coherence of their laser source in terms of the high resolution and fine contrast of the generated interference fringes it can produce. However, high spatial coherence can also lead to the generation of spurious background interference fringe patterns (noise) that can conflict with the fringe detection of the desired measurement foreground interference fringes (fringes). The described method of surface interrogation utilizes custom hardware and analysis software to remove the noise from the fringes for pre-measurement calibration by subtracting out short range retrace errors from the data capture to generate a high quality background image that can then be subtracted from test interferometry. By comparing at least two optical wavefronts of short range retrace errors the wavefronts can be compared and wave interference between them can be removed. Increasing the number of wavefronts by oscillating the interference fringes in a phasing process provides a full system background characterization which can then be subtracted out to remove contaminated or spurious patterns originating from the interferometry system. The background can then be subtracted from a characterization of the test surface to provide a cost-effective and accurate test surface characterization.

FIG. 1 is a system diagram for a Fizeau interferometer with a tilt stage 10. The interferometry system 2 has illumination light source 18 for generating an input light wave and a diverging lens 4 for directing and expanding the light wave toward a collimating lens 6. In one embodiment the light source 18 is a laser, in one example this can be a polarized helium-neon laser producing a measurement wavelength radiation of approximately 633 nm. Beam-splitter cube 8 passes the incident P-polarized light wave beam through the ¼ waveplate 20 causing it to become circularly polarized before transmitting through and partially reflecting off of the reference surface mounted within the tilt stage 10 before interacting with and partially reflecting off the surface-under-test 16 (also referred to as the test surface). Both the reference surface and the test surface 16 reflect their wavefronts back through the system that combine to form the desired measurement interference pattern. This combined wavefront travels backwards incident on the ¼ waveplate 20, which transmits and rotates into an S-polarized light beam. Beam-splitter cube 8 then reflects the incident S-polarized light through the camera lens 14, which aims and focuses the incoming light beam onto camera 12. The camera 12 is a high-resolution camera capable of receiving the interference image created by the recombination of the separated beams. The Fizeau Interferometer shown herein uses a diode-pumped solid-state (DPSS) laser source at 671 nm with system optics and camera operating well at this wavelength. However, it is possible that other illumination light sources may also be used that produce other measurement radiation with different wavelengths, both monochromatic and broadband, in the visible and non-visible wavelength range of electromagnetic radiation, provided that suitable image captures can be obtained within the considered operable range of all required optical and sensory components.

As Fizeau interferometers are widely used for optical surface characterization, the test surface 16 is a requirement of the interferometer to produce its measurement. If the test surface 16 is not present at the time of measurement the interferometer will still produce the background corrected system aperture, but as it will be lacking fringe data, it will have nothing to calculate and thus no surface reconstruction data to populate. Fizeau interferometers use linearly polarized light in the light generation arm of the device to allow for the measurement surface combination arm of the device to be redirected on to the desired system imaging arm of the device. The light that is travelling from the light generation arm of the device is P-polarized and passed through the system polarizing beam-splitter cube 8. Upon passing through the ¼ waveplate 20 the P-polarized light becomes circularly polarized and allows for the measurement surface arm combination to create the desired interference pattern. The reflected interference pattern light then travels back through the ¼ waveplate 20 and is rotated into linear S-polarized light, which is then reflected by the beam-splitter cube 8 into the imaging arm of the device to be captured by the system camera 12.

The interferometry system 2 shown also includes a tilt stage 10 that has an optical reference surface with piezoelectric tilt actuator and driver circuit with a microcontroller 22 having firmware and/or software which controls the movement between the interferometer reference surface along a single mechanical tilt axis coaxial with the input wave from the light source 18. The plurality of images that are captured during piezoelectric oscillation of the tilt actuator are used for background subtraction. In particular, these images are processed together in a computer 24 to eliminate the foreground features present on the images (i.e. fringes) to obtain an image representative of the illuminated background which contains all the system noise. The images obtained with the off-full and on-full actuator positions (foreground) are then normalized by the illuminated background image by dividing the foreground images by the background image at a per pixel level. The resulting images have the fringes available for measurement while the noise has been subtracted and strongly reduced.

Figure 2:
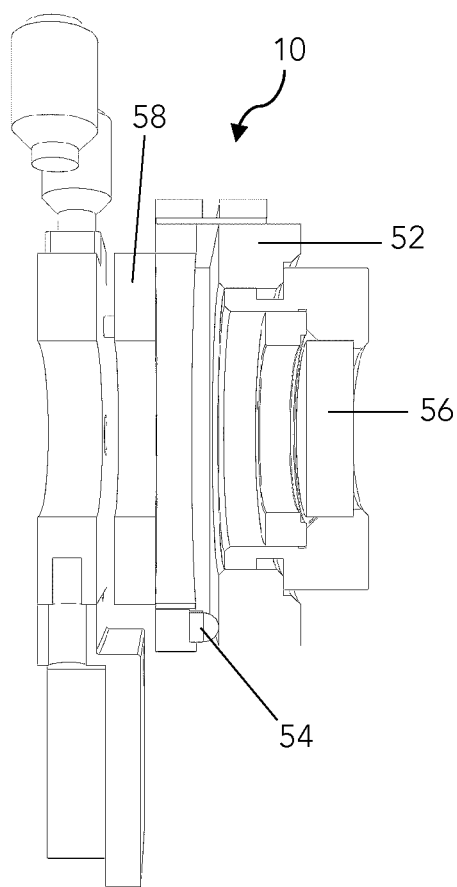
FIG. 2 is a side cross-sectional view of a tilt stage actuator.

FIG. 2 is a side cross-sectional view of one example of a tilt stage 10 with tilt actuator 54. The reference surface 56 is installed in a mount that is fixed over a pivoting mount 52, which is tilted in one angular direction by a piezoelectric tilt actuator 54. The mount for the reference surface 56 is preferably a removable quick-connect mount for easy mounting and removal of the reference surface 56. The actuator is driven by a microcontroller circuit that communicates with the interferometer's computer. In the embodiment shown, the piezoelectric tilt actuator 54 is mounted into a recess on the attachment bracket 58. Wires are run through a cut out on the bracket and down through the interferometer device and into a piezo driver board that is mounted onto its base plate. The dual axis pivoting mount 52 of the tilt stage and reference surface bracket of the embodiment shown are mounted to each other by a piece of 1 mm thick spring steel, which can be a flat steel spring. The thickness of the spring steel is thin enough to allow the piezo to push against the bracket to allow the micro-tilting of the reference surface element while minimising movements on other directions. Other flexible materials with potential elastic energy can be used in place of the steel spring including but not limited to biased materials such as polymers. In one embodiment there can be a slight initial tilt inward, away from the bracket that helps it pull towards the piezo before the actuation occurs. It is noted that in the system as described the orientation of actuation is only on one axis, however it is evident that this method can also work for any other axis by adjusting the tilt with a second actuator at an angle offset from the first tilt actuator, for example at a 90 degree angle to first tilt actuator. In this configuration the driver electronics and the software could be adjusted on the fringe detection side as the resulting fringe orientation could be in any direction.

In use, the interferometer operator aligns the reference surface such that its reflected reference surface aperture is aligned centrally on the camera sensor. This is made possible by the alignment of the interferometer reference surface opto-mechanical mounting, tilt, and positional control components, as well as the computer software allowing for, for example, the temporary use of a computer generated crosshair that is overlaid in the interferometer live video feed during the alignment procedure. Once the reference surface is properly aligned, the surface-under-test is then adjusted using the opto-mechanical mounting, tilt, and positional control components that it is mounted to. The surface-under-test alignment ensures that its surface reflection is travelling back along the same optical path as the reference surface and can be verified by the observation of an interference fringe pattern being displayed at the camera sensor. The reference surface is then controllably tilted to become a non-zero angle of incidence in relationship to the directional axis of the input wave. It is important to note that interferometer technology generally allows for different fringe pattern shapes to be analyzed, however this device example is specifically tuned to the measurement of line shaped fringes whereby their orientation in relationship to the axis of actuation is important to maintain. The horizontal fringe orientation observed in FIGS. 6A through 6D represent a fringe orientation that is parallel with the long axis of the pivoting mount 52 in FIG. 2 and perpendicular with the axis of induced mechanical tilt. When the actuation of the piezo actuator 54 in FIG. 4B increases, the reference surface tilt displacement from null is visually observed as an increase in the number of fringes and wavefront tilt. If the fringes are oriented approximately vertically or approximately 90 degrees to the fringes shown in FIGS. 6A through 6D then the reference surface tilt displacement from null will not substantially change as the piezo tilt actuated axis will be approximately 90 degrees from the manually induced tilt of the optical surfaces.

The system high resolution camera is set up to capture an image when the piezo is off, to capture an image when the piezo is on, and to capture a plurality of images while the tilt actuator is oscillating, and with the plurality of images captured at different angles relative to the input wave. The piezo off capture configuration is critical for surface metrology, but it is also used with the on capture configuration to determine z-axis surface directionality during image processing through the amount of relative fringe displacement between both images and the known induced direction of actuation of the tilt stage, which translates into the overall convexity or concavity of the surface-under-test. As the position of the tilt actuator is known and thus the exact orientation of the axis of increased tilt, a simple higher versus lower relative displacement against that of the axis of increased tilt can be used to infer the convex or concave surface direction. The convex/concave surface direction inference is impossible with a single image, static fringe analysis system. The camera exposure time ranges to provide the desired background subtraction is any exposure time that is less than 1 millisecond which does not have excessive structured noise at the required gain settings. Preferable exposure time to eliminate environmental measurement contamination, mainly vibration, has been found to be less than 100 µs, however exposure times of 500 µs have also been found to be sufficient in balancing noise to exposure. A specialised auto-camera-gain feature can also provide optimized exposure of the images captured. Laser output power over the lifetime of an interferometer can decrease, which results in the dimming of the aperture over time.

In conjunction with fast camera shutter speeds, camera gain adjustments can be used to compensate for aperture saturation inconsistencies within the clear aperture of the system as the measurement environment change in between interferometric measurements. These changes in the measurement environment can include but are not limited to the instability within the laser system, higher mirror-like surface reflections, or drastically changing the fill conditions of the system aperture. If the camera gain is optimized for aperture underfilling conditions and then changed to an aperture overfilling condition, for instance, the optimal camera conditions between the background and the fringe images can become so different that the data becomes almost unusable for a background subtraction measurement. To accommodate for the change in conditions of the interferometer and its components, the method of static fringe analysis to interrogate and remove the system background is preferably undertaken with every measurement, and preferably concurrently with the measurement of the surface-under-test. The full procedure of background subtraction after the camera gain adjustment can thereby be optimized for every measurement to avoid the introduction of system and environmental aberration in the surface measurement. The result is a real-time background subtraction concurrently occurring as the surface-under-test is being measured, as opposed to requiring an initial and preliminary calibration measurement using an "ideal" reference before setting up to measure the test surface. Due to the number of possible clear aperture image variations standard complementary metal-oxide-semiconductor (CMOS) and charge coupled device (CCD) cameras using integrated filters like region of interest (ROI) or automatic gain may not be adaptive enough to achieve this image processing goal. A further image processing step can be used to crop or reduce the aperture size of the active area of the processed image in order to provide improved fringe measurements. This can be achieved by optimizing the dynamic range of the image by controlling the gain levels of the camera through custom software control whereby the alternating black and white fringes that remain in the cropped image are increased in contrast compared to non-active background as the total image gain decreases and the background is effectively nullified. Other methods can also be used to provide gain adjustments to the fringe images. The present method thus provides a fast and easy way of background subtraction concurrent with surface analysis.

The tilt stage 10 can be provided mounted in an interferometer, or as a mountable device to retrofit an existing interferometer. For the integrated interferometer developed for this metrology method, the reference surface is the ideal candidate for tilt oscillation as the reference surface mount is integrated within the device. This allows for ideal wiring arrangements as well as less mechanical position control complexity considerations that the surface-under-test mounting platforms often require. While retrofit interferometer projects would require modifications to implement this reference surface tilt oscillation method, the surface-under-test 16 would also work and could be designed as a preassembled unit. Depending on the aperture size of the retrofit interferometer, a surface-under-test 16 platform could be built for both vertical and horizontal interferometer metrology arrangements that provides three primary translational axis of movement plus two translation tilt axis of movement with an integrated spring hinge axis of oscillation. With an external computer system connected to the interferometer camera and piezo driver, all of the necessary functionality is contained therein to perform measurements.

Figure 3:
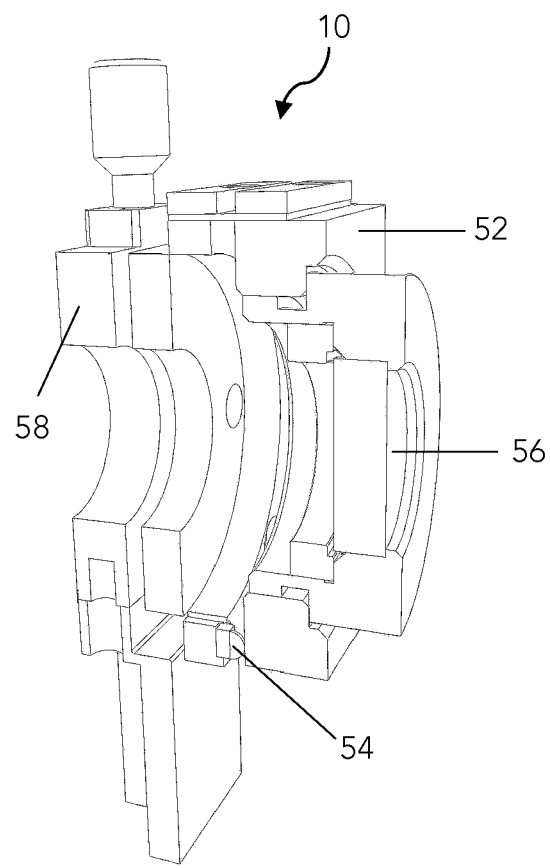
FIG. 3 is an isometric cross-sectional view of a tilt stage actuator.

FIG. 3 is an isometric cross-sectional view of a tilt stage actuator 10 with a removable quick-connect mount for securing the reference surface 56 in the pivoting mount 52 in such a way that it can be controllably tilted relative to attachment bracket 58 by the piezoelectric tilt actuator 54 which controllably tilts the pivoting mount 52. The pivoting mount 52 is connected to attachment bracket 58 to allow for manual tilt control of the reference surface. This allows for the reference surface reflection to maintain a perfect perpendicular alignment back through the system to the camera.

Figure 4A:
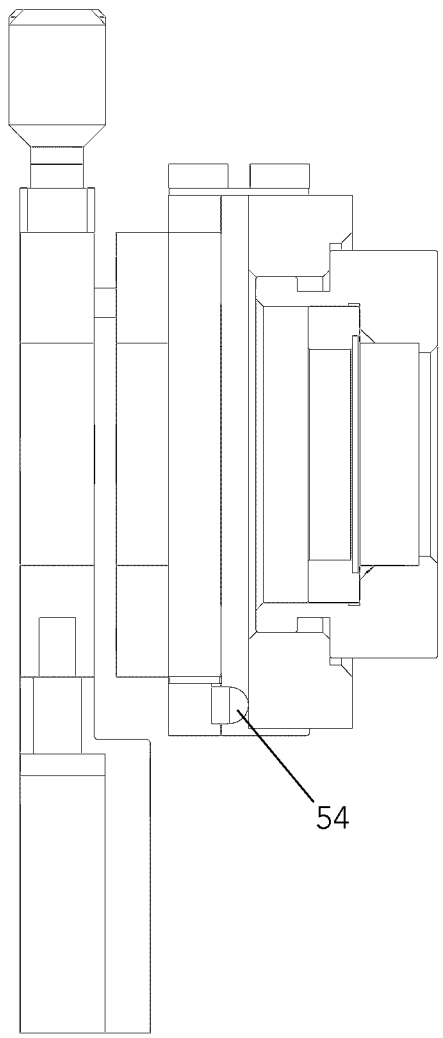
FIG. 4A is a side cross-sectional view of a tilt stage actuator in a vertical position.
Figure 4B:
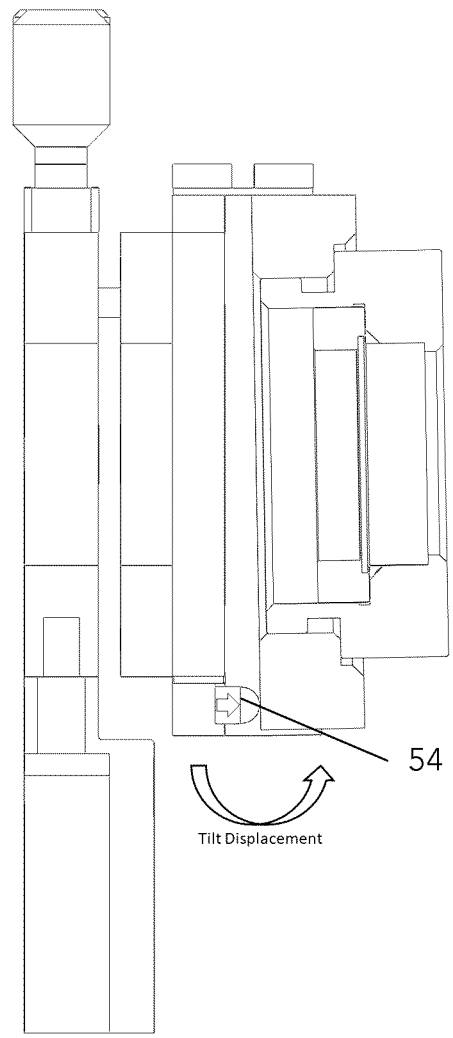
FIG. 4B is a side cross-sectional view of a tilt stage actuator in a tilted position.

FIG. 4A is a side cross-sectional view of a tilt stage actuator in a vertical position and FIG. 4B is a side cross-sectional view of a tilt stage actuator in a tilted position. In one embodiment the tilt displacement provided by the tilt actuator 54 for the developed integrated interferometer is 2.8 micron over a mechanical mounting distance of 71 mm. This constitutes a 1-micron displacement over the 1-inch aperture this system was designed for. In order to determine the directionality of the z-axis direction, this was empirically determined to be the minimum amount of displacement required for this feature to work properly. For larger aperture implementation of this system the preferred displacement minimum is 1-micron for every 1-inch of optical aperture being measured. The piezoelectric chip shown has a displacement of 2.8 μm+/−15% at 75 V with a recommended maximum load of 400N (90 lbs) and a capacitance of 950 nF+/−15%. An end hemisphere is adhered onto the flat surface of the piezo to allow the curved surface to nudge the reference element at the apex of its radius.

In one example the integrated interferometer has a piezo displacement of 2.8 μm (angular displacement of ~8 arcsec), which provides an accurate directionality determination down to about 25% of the 1-inch aperture. If the aperture is underfilled to 25% or less, an increase in the displacement may be needed to compensate for the underfilling of the aperture. This method has been found to work both for interferometer retrofits as well as built-in systems, and for both 4-inch and 6-inch aperture systems using varying actuation distances. The system and method specifications can be adjusted based on the size of the aperture being measured and the predicted amount of tilt to ensure directionality is accurate. In one example, for every 1-inch of reference aperture, it has been found that a single axis tilt displacement of at least 1 micron will ensure directionality can be determined for more than 25% of the aperture being filled. Greater tilt displacements can ensure that smaller aperture sizes can be measured properly such as, for example, 1.5 to 2 microns or greater. In the case of a 1-inch aperture system with an assembly 71 mm in length, a 2.8 μm displacement across the entire tilt stage equates to only a 1 micron displacement in the actual reference surface. If applied to larger aperture sizes, a 4-inch reference would preferably have a minimum 4 μm displacement, and a 6-inch reference would preferably have a minimum 6 μm displacement. Calculations of tilt displacement relative to aperture size can thereby be done to accommodate a wide variety of aperture sizes and system sizes.

Application of the present system can also be useful when knowing the directionality of the surface-under-test is desired. Every optical surface is non-flat and will have a shape profile with one or more crests, troughs, concavities, or convexities in the surface. During manufacturing, it is important to know the directionality of the surface so that surface modifications can be made and correct manufacturing tooling corrections may be applied to flatten highs and avoid lows in the optical surface. Knowing the directionality of the optical surface provides the position of the three-dimensional surface profile features so that these features can be adjusted during manufacturing. Using the tilt actuator to tilt either the surface-under-test or the reference surface at a single different angle to one another provides the directionality of the surface-under-test so the position of these surface profile features can be known.

Figure 5:
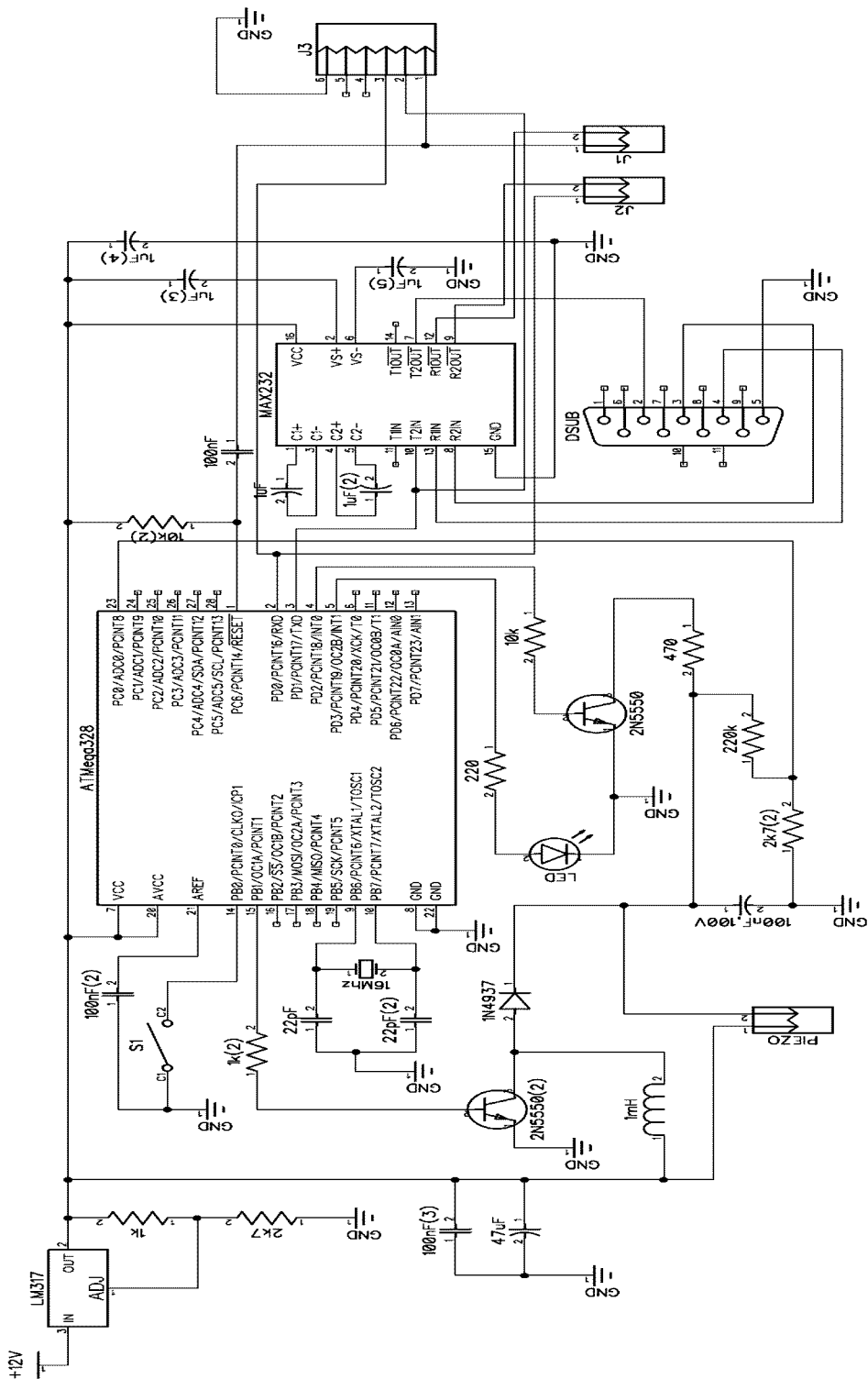
FIG. 5 is a microcontroller circuit diagram of a tilt stage actuator controller.

FIG. 5 is a microcontroller circuit diagram of a tilt stage actuator controller, herein called the microcontroller. While the microcontroller is the programmable aspect of the system that allowed design variability, the supporting driving circuit supplies the necessary driving voltage of the piezo actuator. The microcontroller, as referred to herein, includes both the programmable microcontroller and the associate piezoelectric driving circuit. The microcontroller and piezoelectric driver is preferably integrated into the first tier of the interferometer system. The circuitry is designed to amplify the voltage input to 75V by using an inductive DC-DC closed-loop boost converter. The maximum voltage is easily variable adjusting a parameter on microcontroller's firmware, despite of the simplicity of the circuit design. The relationship between voltage and piezoelectric chip displacement is reasonably linear where half the voltage would result in a displacement of half the distance. This specific circuit was designed around a low-cost and electrically safer implementation of the technology; however the circuit could easily be adapted for voltages of 100V to 200V.

A DC-DC closed-loop boost converter creates the high voltage to drive the piezoelectric actuator. The piezoelectric actuator is wired with an RC (resistor-capacitor) low pass filter network setup to filter out the high frequency signals and maintain the 1 Hz frequency that is used for the application. Due to the very low capacitance of the piezoelectric chip (950 nF), a low current is needed to power it, as follows (approximation, considering a sinusoidal wave):

$$iA = f * C * Vpp$$

$$iA = 1\ Hz * 905\ nF * 75V$$

$$iA = 71.25\ uA$$

where:
iA=average amplified source/sink current (A)
f=max operating frequency (Hz)
C=piezo actuator capacitance (F)
Vpp=peak-to-peak drive voltage (V)

The driver circuit shown is programmed by an ATMega microcontroller to generate a sawtooth wave that achieves 1 Hz and is able to generate a high voltage of 75 V. This allows the maximization of the force capability of the selected piezoelectric chip. The sawtooth wave created is 75 Vpp with a +37.5V DC bias. This means that negative voltage is not created. A 470 Ohm resistor connected to ground through a NPN transistor allows for the waveform to drop immediately after reaching its peak. Under static conditions, the expansion of the piezo actuator is proportional to the voltage. Hence, feeding in a dedicated waveform allows for the piezoelectric chip to expand in thickness gradually and almost instantly retract back to its initial form. The chip expansion and retraction causes the attached hemisphere to push against the reference surface, creating the ripple effect seen on the live feed of the software. The 1 Hz frequency of the generated sawtooth waveform works optimally with the CMOS (complementary metal-oxide-semiconductor) camera where 60 images for background subtraction are captured over the 1 second period of actuation. This corresponds to a common camera framerate of 60 fps (frames per second) which was found to give quality phasing results in this instance. One advantage of the present system is that this method does not require synchronous operation between the actuation and camera as, using the sawtooth wave, each image captured within the one second period will correspond to a different piezo position independent of when in the cycle the image capture is started. In this example, the camera exposure for each image capture was 500 μs to help decrease environmental interference, with the fringe image capture still spaced evenly over the camera 60 fps criteria or approximately 16.6667 ms. Depending on the processing power, sensitivity, and signal-to-noise capabilities of the system, faster camera exposure times and fewer images may be possible to produce quality background subtraction as well. This arrangement was found to maintain a low-cost system, with a balance in time, cost, and performance. A serial transmitter/receiver is used to allow the communication between the computer in the system and the microcontroller of the driver circuit which grants the acquisition software control capability of the piezoelectric actuator.

Figure 6A:
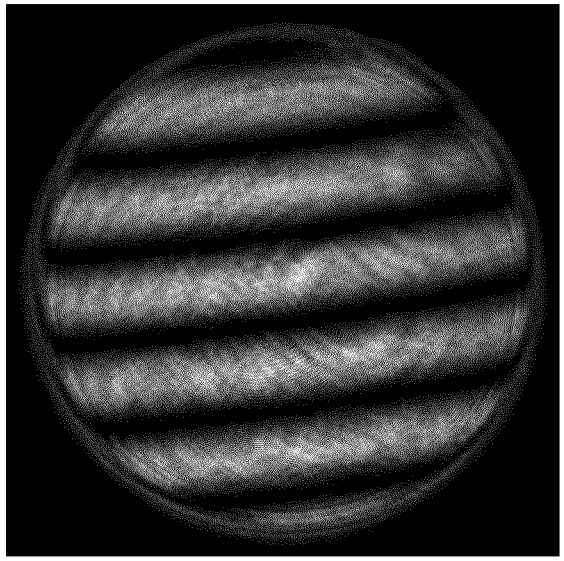
FIG. 6A is an example interferogram recorded with the tilt actuator off.
Figure 6B:
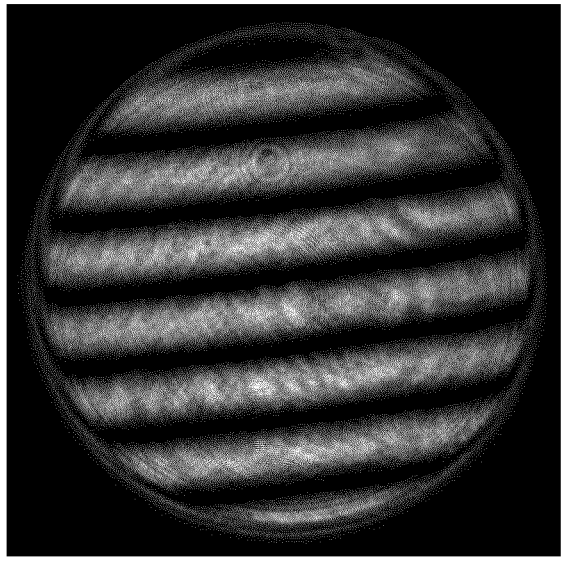
FIG. 6B is an example interferogram recorded with the tilt actuator at a first intermediate position.
Figure 6C:
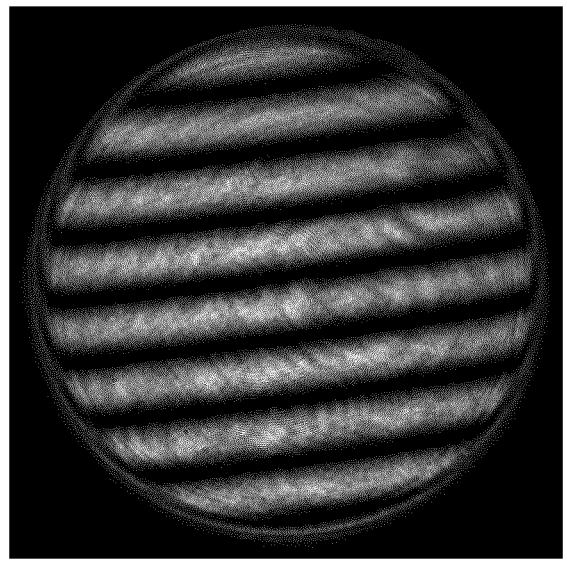
FIG. 6C is an example interferogram recorded with the tilt actuator at a second intermediate position.
Figure 6D:
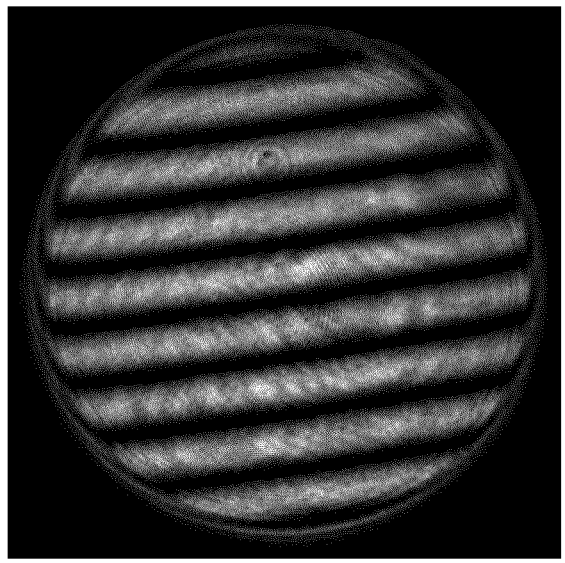

FIGS. 6A-D are illustrative interferograms obtained at different positions of the tilt actuator. FIG. 6A is an example interferogram recorded with the tilt actuator off; FIG. 6B is an example interferogram recorded with the tilt actuator at a first intermediate position; FIG. 6C is an example interferogram recorded with the tilt actuator at a second intermediate position; and FIG. 6D is an example interferogram recorded with the tilt actuator on. It is evident that the interference fringes in each interferogram change in number and pattern based on the position of the reference surface due to the surface tilt during image capture. A plurality of interference patterns is collected at various positions of the reference surface to provide enough images to generate a single image of the reference surface, which can then be used in background subtraction.

FIG. 7 is an image of the background of the reference surface that can be used in background subtraction. The optics, environment, and system configuration of every interferometer present irregularities that show on the interferogram as darker and brighter spots and stripes, also referred to as defects, and can affect the correct detection of interference fringe centres. In a static fringe analysis interferometer, which utilizes a simplified optical path, this problem can become very pronounced as the required fringe centre detection can be influenced by these defects and result in an incorrect surface profile calculation. In a classical analysis, the positions of the fringe centres are measured, and deviations from straightness and equal spacing provides information on the test surface aberrations. However, when background short range retrace errors also causes misalignment of fringe centres, it can be challenging to tease apart defects caused by system optics compared to those caused by test surface optical aberrations. During tilt actuation, while the fringes on the interferogram change in position when the reference surface is tilted, the optical generated defects do not move. Thus, in a standard system there exists a background with darker and brighter regions with dark fringes moving over it. This background can only be seen between the dark fringes, however if the fringes are moved in a controlled manner and a sufficient number of images are acquired, the entire background can be recovered. The background image can then be "subtracted" from any static fringe image captured in the plurality of captured images for noise reduction, resulting in a clean image with the background defects highly minimized.

FIGS. 8A and 8B show the results of background subtraction for interferograms at two different tilt positions of the reference surface. In particular, FIG. 8A is an example interferogram recorded with the tilt actuator off and background subtracted and blurred, and FIG. 8B is an example interferogram recorded with the tilt actuator on and background subtracted and blurred. Compared to the interferograms shown in FIGS. 6A and 6D which are raw data interferograms when the tilt actuator was off (6A) and on (6B), it is evident that background subtraction is capable of removing much of the erroneous data caused by optical generated defects.

Figure 9:
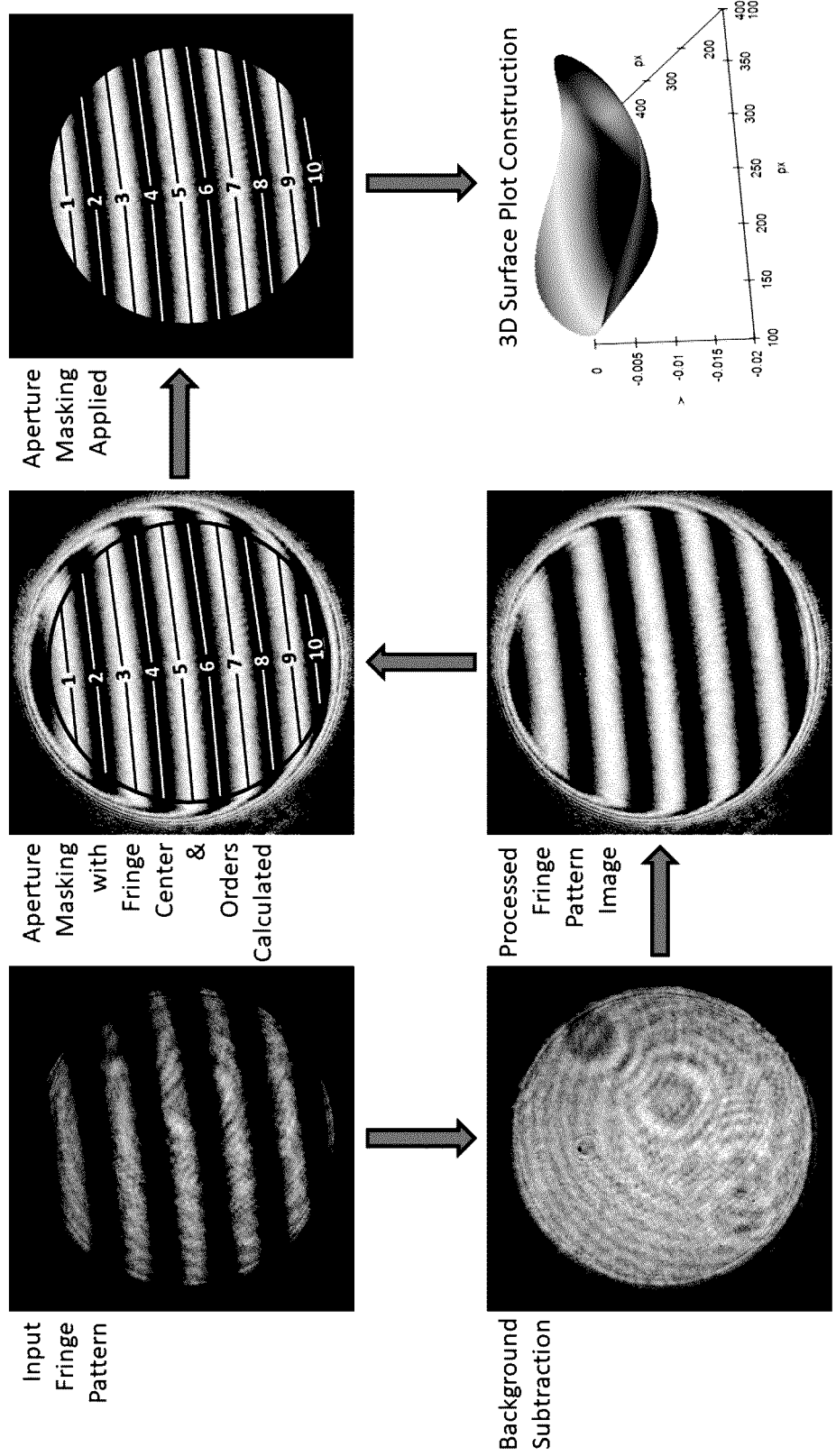
FIG. 9 is an illustration of a process for optical surface analysis using enhanced static fringe capture.

FIG. 9 is an illustration of a process for optical surface analysis using enhanced static fringe capture. A method of capture of a plurality of interferograms using a Fizeau interferometer as previously described is applied to provide a plurality of input fringe patterns, specifically capturing multiple interferograms at various tilt angles. A single input fringe pattern is shown, however it is understood that multiple fringe patterns at a variety of reference surface tilt angles are required for the analysis. A background subtraction is then done as previously described to provide an image of the background in the absence of the fringes. The fringe pattern is then processed and the background interference is subtracted from the fringe pattern foreground to provide a combined and heavily noise reduced interferogram. Once the processed image is available, the surface-under-test fringe pattern has a defined masking aperture applied to it in the software, either automatically as a percentage of the automatically detected surface-under-test area or through user definition. Once the mask is applied to the processed image the software uses various image processing methods to locate and mark the center of the bright and dark fringes across their entire length, but within the bounds of the masking aperture. The center of the fringes are then ordered 1 to the maximum number of visible fringes on the image, which in this system is optimized for between 6 and 20 fringes. Everything outside of this masking aperture is ignored in the calculation and removed from the final processed image. Once all this information is available the software can then calculate the optical surface profile that is defined within the masking aperture. This can be performed in this system by using Zernike's polynomials, however Fourier Transform methodologies could also be used.

With this calculated information a three-dimensional surface plot can then be rendered including the numerical values for its surface characteristics and aberrations including but not limited to peak-to-valley (PV), root mean square (RMS), power, and tilt. This surface plot can also be amended in real-time by mathematically removing aberrations from the calculated surface reconstruction where deemed necessary by the system and/or user. In an example, a highly planar surface will have regular, straight fringes, whereas a bumpy or non-planar surface will have non-linear fringes in the interferogram image. By comparing the fringe images at various tilt angles is noted that referencing the direction and difference of the tilt angle and difference and shape of the fringe images ascertain the concavity or convexity of the surface. In particular, information on fringe curvature and distance between fringes in multiple images combined with the tilt direction can be used to provide additional information on the surface properties at the image location.

Figure 10A:
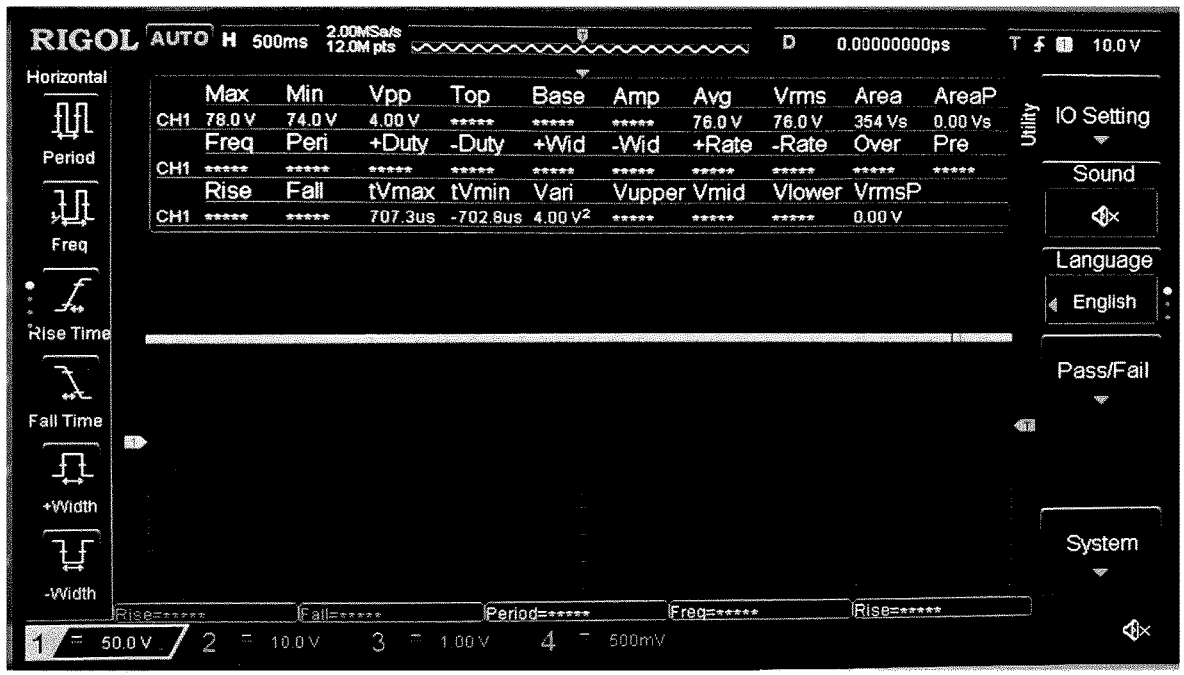
FIG. 10A is a user interface showing a continuous signal of 75V potential difference (C75V)
Figure 10B:
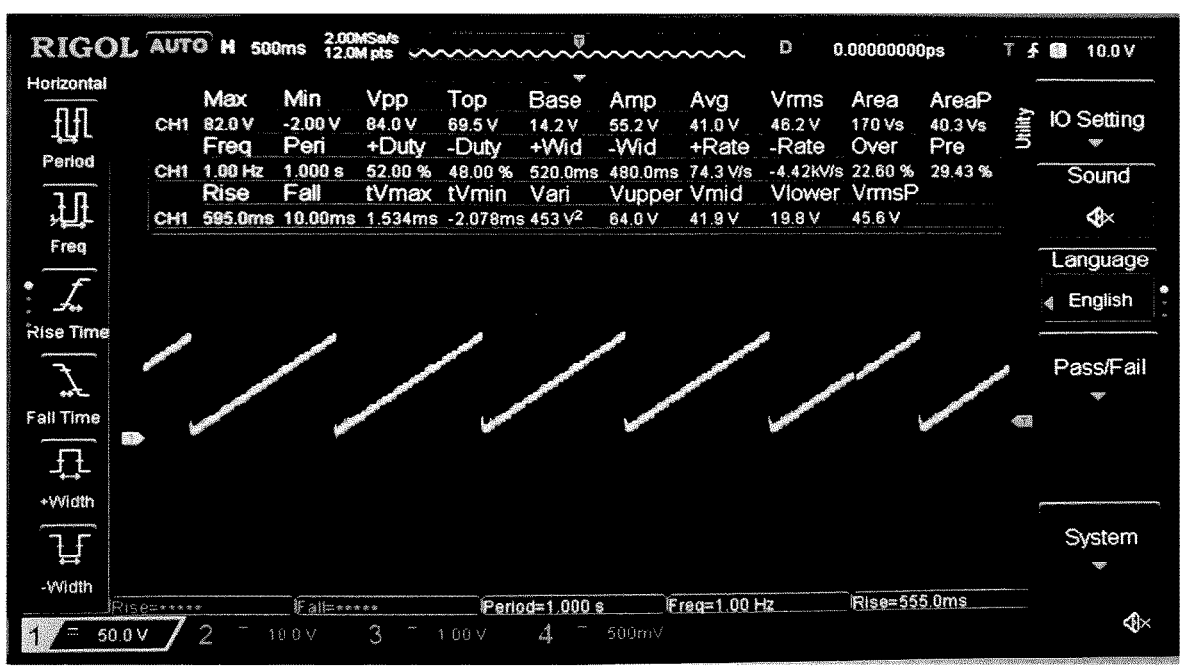
FIG. 10B is a user interface showing a direct current sawtooth signal, with 1 Hz frequency.
Figure 10C:
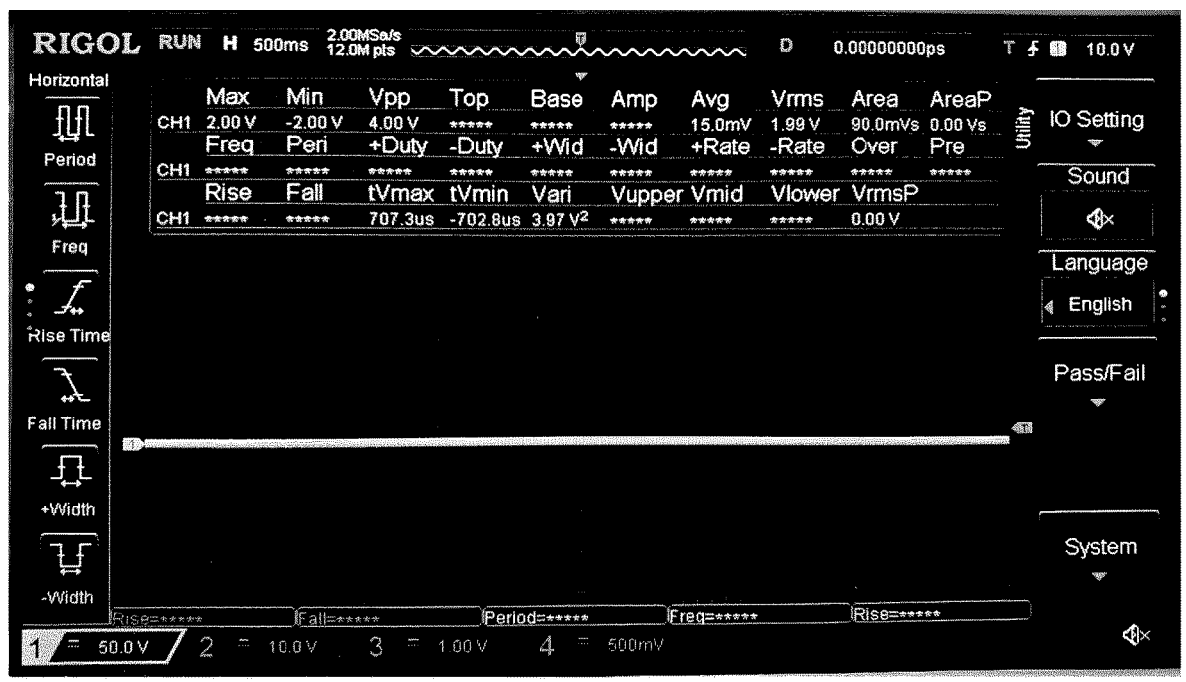
FIG. 10C is a user interface showing a continuous potential difference of 0V.

FIGS. 10A-C illustrate user interfaces showing the voltage signal sent to the piezoelectric tilt actuator for controlling the tilt of the reference surface. FIG. 10A shows a continuous signal of 75V potential difference (C75V); FIG. 10B shows a direct current sawtooth signal, with 1 Hz frequency; and FIG. 10C shows a continuous potential difference of 0V. In one embodiment the tilt actuator has at least three modes of operation, when the actuator is either off-full (C0V), on-full (C75V), or sawtooth oscillated at 1 Hz (ST0_75V). These three signals are used in different phases of image acquisition. In particular, these three modes provide the necessary control to phase the optical foreground to allow for background subtraction and to observe the increase or decrease tilt associated with z-axis convex or concave surface direction. The actuator is driven by a microcontroller circuit that communicates with the interferometer's computer to output the at least three distinct signals: a continuous signal of 0V potential difference (C0V, as shown in FIG. 10A); a continuous signal of 75V potential difference (C75V, as shown in FIG. 10B); and a direct current sawtooth signal, with 1 Hz frequency, and potential difference of 0V to 75V (ST0_75V as shown in FIG. 10C). These three signals are used in different phases of image acquisition. In particular, these three modes provide the necessary control to phase the optical foreground to allow for background subtraction and to observe the increase or decrease tilt associated with z-axis convex or concave surface direction.

Figure 11:
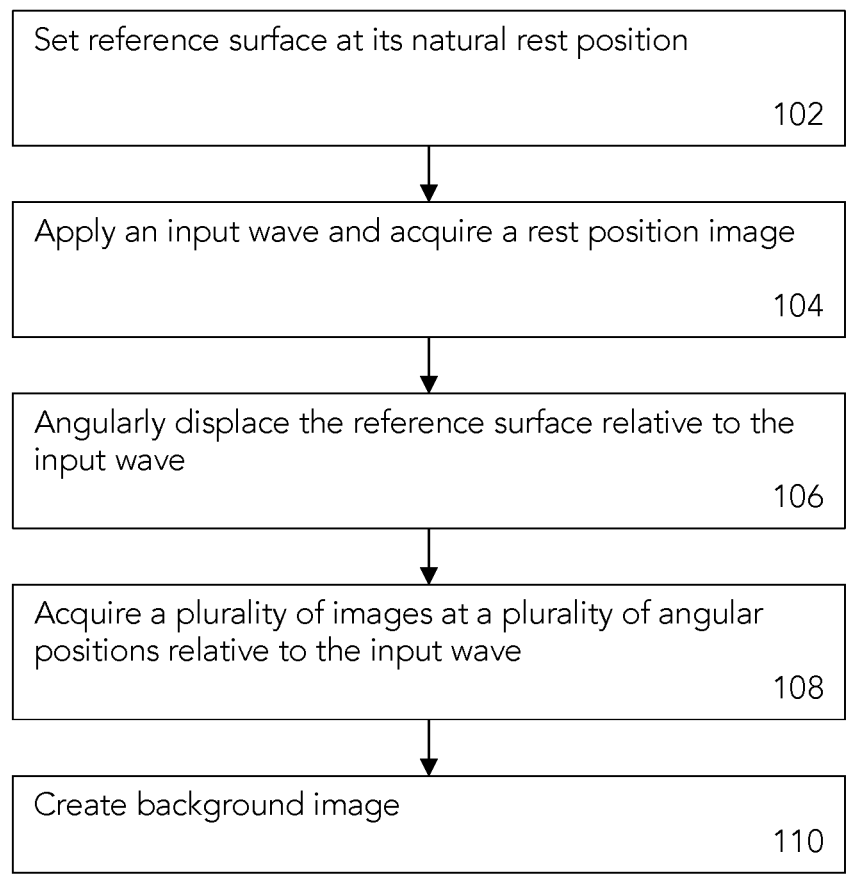
FIG. 11 is a method of background subtraction using the present system.

FIG. 11 is one method of background subtraction using the present system, outlined as follows. Upon the user alignment of the reference surface and surface-under-test, the reference surface is set at its natural rest position 102. To ensure the correct rest position image is taken the piezoelectric tilt actuator driver is set to C0V and an interferogram image is acquired (Image_Piezo_Off_Raw) 104. The piezoelectric tilt actuator driver is then set to ST0_75V, making the reference surface vibrate 106 at an angular displacement range. The vibration and angular displacement frequency should be sufficient to enable multiple images to be taken in a short period of time showing fringe displacement at varying background angles. In one trial, the vibration frequency was set at 1 Hz. A set of interferogram images is then acquired (Images Sequence) 108. In the same trial, 60 images were obtained at a frame rate of 60 images per second. Thus, the images were acquired in one second, which corresponds to one period of the frequency of vibration (1 Hz). As a consequence, each of the plurality of acquired images will correspond to a view of the reference surface at a different angular position and thus the 60 images will each have a different interferogram pattern. Preferably at least 30 images are acquired, and more preferably between 30-120 images. Varying tilt actuator frequencies and image acquisition frequencies can be used, providing there is an offset in the angular tilt of the reference surface for each of the acquired images to provide sufficient data to perform the background subtraction calculation. The number of fringes should not have an impact in whether this background subtraction calculation can be done, however the accuracy of the static fringe analysis will be impacted as empirically fewer then 5 fringes is not enough information for an adequate surface reconstruction and greater then 25 fringes has been found to result in a loss of measurement resolution resulting in an inaccurate surface reconstruction. Finally, the piezoelectric tilt actuator driver is then set to C75V changing the reference surface position to be at its maximum tilt and an interferogram image is acquired (Image_Piezo_On_Raw).

The following example method is described, though it is understood that the same may be accomplished in other ways. A background image is then created 110 by pixel-by-pixel selection of the acquired images undergoing fringe displacement. In this example method, this is done by taking the pixel-by-pixel maximum of all the collected images in the image sequence (Images Sequence). The first pixel on every image is then compared within all sequenced images (Images Sequency) and the one with the maximum value is selected. This pixel is then set as the value of the first pixel on the background image. The second pixel on every image is then compared within all sequenced images (Images Sequency) and the one with the maximum value is again selected. This pixel is then set as the value of the second pixel on the background image. This process is then repeated for all of the pixels and the aggregate is provided as the background image as shown in FIG. 7.

Once the image background has been created from the plurality of images the processed image with fringes and with the background subtracted is created. This is done for both the Image_Piezo_Off_Raw and Image_Piezo_On_Raw images that represent the tilt stage at rest and the tilt stage at full actuation. Before this can be done the contrast of the background images are stretched in a way that the resulting image has intensity values of between 1 and 255 to create new values (NV). Contrast stretching which is also known as normalization is an image enhancement technique that attempts to improve the contrast in an image by stretching the range of intensity values it contains to span a desired range of values, which in this case is 1 to 255. The maximum value of all pixels of the background image (Max) and the minimum value of all pixels of the background image (Min) are obtained. For each pixel of the background image the current value (CV) is replaced by a new value (NV) corresponding to:

$$NV=(CV-Min)/(Max-Min)*254)+1$$

Once the background images have been stretched and their new background image values created, a new image, Image_Piezo_On is created by dividing, pixel-by-pixel, the Image_Piezo_On_Raw by the background image. This is done by dividing the intensity value of the first pixel of the Image_Piezo_On_Raw by the intensity value of the first pixel of the background image and storing the result at the first pixel of the Image_Piezo_On. This process is repeated for all remaining pixels to create the new image, Image_Piezo_On. Once complete, a new image, Image_Piezo_Off is created by dividing, pixel-by-pixel, the Image_Piezo_Off_Raw by the background image. This is done by dividing the intensity value of the first pixel of the Image_Piezo_Off_Raw by the intensity value of the first pixel of the background image and storing the result at the first pixel of the Image_Piezo_Off. This process is repeated for all remaining pixels to create the new image, Image_Piezo_Off. This operation "subtracts" the defects on the background, creating a clean image of the fringes.

After the creation of the new Image_Piezo_On and Image_Piezo_Off images, additional image processing is required before fringe detection and measurement can occur. Thus, the contrast of both the Image_Piezo_On and Image_Piezo_Off images are stretched in a way that the resulting images have intensity values of between 0 and 255 using the method described above. A temporary blurred image is then created by blurring the Image_Piezo_On with a Gaussian blur with a kernel size of 71×71 pixels, which is also repeated for Image_Piezo_Off image. The maximum value of all pixels of the temporary blurred image (Max) and the minimum value of all pixels of the temporary blurred image (Min) is then obtained. For each pixel of the Image_Piezo_On image, the current value (CV) is replaced by a new value (NV) corresponding to:

NV=(CV−Min)/(Max−Min)*255

This process is again repeated for the Image_Piezo_Off image. For each pixel of the Image_Piezo_On image, if the pixel value is greater than 255, it is replaced by 255 and if the pixel value is smaller than 0, it is replaced by 0. This process is again repeated for the Image_Piezo_Off image. After the image capture the operations on the image are done using double precision floating point numbers. With this format, and values from 0 to 255, the precision of the numbers are on the $14^{th}$ decimal digit. This allows the use of the division to subtract the background, without significant information loss.

Detection of the surface direction can further be done by fast processing two static fringe images. The present system is capable of detecting the centre of the dark and the light fringes which enables accurate and consistent image data capture. This duplicates the amount of data available for processing, which decreases the amount of tilt necessary for measurement and as such the introduction of tilt-induced coma aberration. To do so the image Image_Piezo_Off obtained by background subtraction is blurred using a Gaussian blur with a kernel size equal to:

kernelSize=int(ApertureRadius**1.05/5)+3

The blur highly attenuates the high frequency noise. This noise is created by the image detector electronics with the fast shutter acquisition time necessary to avoid motion blurring on the fringes' centres. An empty image is then created with the same dimensions (Image_Centre). The blurred image is scanned column by column, to detect the local maximums and local minimums, corresponding to the centre of the light and the centre of the dark fringes, respectively. For each column inside the aperture a line-by-line pixel comparison is then done. In particular, if the intensity of the current pixel is greater than the intensity of the pixel immediately above it and the intensity of the current pixel is greater than the intensity of the pixel immediately below it, then the current pixel corresponds to a centre of a light fringe. The corresponding pixel on Image_Centre is then assigned the value 255. If the intensity of the current pixel is less than the intensity of the pixel immediately above it and the intensity of the current pixel is less than the intensity of the pixel immediately below it then the current pixel corresponds to a centre of a dark fringe. The corresponding pixel on Image_Centre is assigned the value 255.

To detect the order of the fringes a binarized copy of the image (Binary_Image) is created by adaptative threshold. In this case the threshold to determine if the current pixel will be 0 or 255 is the average of the pixels around the current pixel, with a square window of size (size×size) defined by:

Size=(2*ApertureRadius DIV 30)*2+1

By multiplying by two and adding one in the end of equation it is guaranteed that size will always be an odd number, a requirement of the adaptative threshold function. An empty image with the same dimensions is then created (Image_Order). A mask is then applied to the Binary_Image making the pixels of the image outside the aperture invalid. The image is scanned line by line until the first valid pixel is found. Starting with the valid pixel all connected valid pixels are recursively visited, and the corresponding pixel on Image_Order is assigned a value. The pixel evaluation algorithm proceeds as follows:

The value starts with 1.

The value is increased by 1 if the color on Binary_Image changes and the algorithm is visiting a pixel which position is below the previous visited pixel.

The value is decreased by 1 if the color on Binary_Image changes and the algorithm is visiting a pixel which position is above the previous visited pixel.

Finally, an image with the ordered fringes' centre (Image_Centre_Ordered) is created by doing a pixel by pixel AND Boolean operation between Image_Centre and Image_Order. Once the fringe centre coordinates have been detected and the correct fringe orders have been produced the static fringe Zernike's computational implementation for surface evaluation can occur. This information is used to produce the high optical surface measurement accuracy this device is capable of. The production of the image that represents all of this information will indicate to the user that the Zernike's computational implementation for surface evaluation has been applied properly. If the fringe orders are not applied linearly then the surface evaluation will be incorrect even if the fringe centres are properly calculated.

The signal of the wavefront as a flat optical surface can have either a positive (convex) or negative (concave) shape. In the case of the present system, which uses static fringes analysis, it is not possible to determine with a single image if the top of the surface in analysis is nearer to the reference surface, or if is its bottom. However, with the known direction of the tilt generated on the reference surface by the tilt actuator, the fringes centre distance should decrease if the top is nearer and should increase if the bottom is nearer. Under normal static fringe analysis conditions, the optical surface would have to be manually adjusted by the operator knowing where the tilt is being applied to ensure the directionality is accurate, and if it is not then to invert the signal.

To check the variation of the fringe centre distance, two different images are used. The fringe centre distance of both Image_Piezo_Off and Image_Piezo_On is measured using the fringe detection method as previously described. In this system example with the tilt stage design factored in, the fringes are originally ordered as if the bottom is nearer to the reference surface, i.e. the fringe order increases top-down. Thus, if the fringe centre distance is smaller on the Image_Piezo_On, it is the top which is nearer, and the signal of the fringes order is inverted. To obtain the fringe separation distance on each image an algorithm similar to one used to determine the fringe centres can be used. However, to save computational time, instead of the entire aperture being processed only a small central vertical strip can be used. This strip or masked processing area can have a height that is equal to the total defined aperture diameter but has a width that is equal to 10% of the total defined aperture diameter. The fringe line centres are then calculated for in this strip and the pixel level distance between them is compared between both the Image_Piezo_Off and Image_Piezo_On images to see if there is a larger or a smaller distance that is measured between them.

A Gaussian blur filter can also be used for the background subtraction and fringe detection operations. The equations to define the kernel size used on different phases of the analysis can be defined empirically and optimized to the camera resolution in use. The minimum camera resolution and bit-depth were determined empirically by using a 12 MP (4 k×3 k pixels) High-Definition CMOS sensor with a 16-Bit Depth to capture all images for processing on the apparatus. Once quality results were observed with the 12 MP sensor, simulations at different bit depth levels and binned resolutions were completed to determine at which point there was enough deterioration in the processed image that quality results could no longer be attained. The minimum requirements of the camera include a resolution of no less than 2 MP (1080P), and a 10-Bit Bit-Depth. The Gaussian blur filter was found to be an ideal choice in the removal of system aperture noise as created by the high spatial coherence of the laser system, as well as the electronic noise created by the camera detector electronics, and the fast shutter acquisition times needed to avoid motion blurring on the fringes.

In an alternative rapid capture procedure, the capture is initiated and an automatically ideal gain is determined. The camera is then setup for capture and a driver circuit reset command is sent. A piezo off image is then collected for directionality comparison and a tilt actuation command is sent to the tilt microcontroller. A piezo on image is then collected for directionality comparison, followed by a reset command. The tilt actuator is then sent an oscillate command and a plurality of images are collected over a short duration of camera frame rate. Once the desired number of images are collected a reset command is sent. The collected images are then processed.

Multiple surfaces were repeatedly tested using the present fringe detection method and implemented Zernike's computational surface evaluation method. The same surfaces were well characterized by a calibrated and certified Phase-Shifting Fizeau Interferometer (PSFI). Measurements were taken on Plano surfaces with varying degrees of surface irregularity from very flat ($<1/20^{th}$ wave at 633 nm) to very un-flat (>1 wave at 633 nm). The measurements were taken with and without power removed, with and without tilt in the measurement, and with and without trim enabled.

FIG. 12A shows the calculation accuracy of the present static fringe detection method against that of a Phase-Shifting Fizeau Interferometer (PSFI) result for a high accuracy (20 thFS) optical surface and FIG. 12B shows the calculation accuracy of the present static fringe detection method against that of a Phase-Shifting Fizeau Interferometer (PSFI) result for a highly irregular (G4) optical surface. This method of testing required the same optical component be measured by both systems under similar operational conditions to provide a correct comparison. The difference in results between both systems were then compared to determine if the present static fringe detection metrology system was able to produce results of the same quality as a PSFI system.

It was observed that when comparing the present static fringe system against the PSFI system in analysing the same optical surface, under the same physical optical component orientation, using the same amount and direction of tilt, while maintaining the same number of fringes and their orientation, the calculated differences between the present system and the standard PSFI system are almost negligible, in particular smaller than about 1/20th of a wave. The present system is thus capable of creating fringe images using the background subtraction method that will have a calculated deviation of within the desired resolution of a 1/20th wave surface to a high degree of accuracy and repeatability.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. An interferometer system comprising:
a light source for providing an input wave with a directional axis;
a beam splitter for splitting the input wave;
a reference surface for receiving the split input wave;
a pivoting mount for releasably engaging the reference surface;
an open loop piezoelectric tilt actuator on the pivoting mount and coupled to the reference surface configured to angularly oscillate the reference surface at a tilt frequency and at a plurality of tilt angles relative to the input wave to provide an angular tilt displacement of the reference surface during image measurement such that the reference surface is at an oscillating non-zero angle of incidence relative to the directional axis of the input wave;
a microcontroller coupled to the tilt actuator for controlling the angular tilt displacement of the tilt actuator;
a detector configured to collect interferometry data from the reference surface comprising a plurality of wavefront measurements; and
a data processing apparatus coupled to the detector for processing interferometry data collected by the detector and overlaying the plurality of wavefront measurements to subtract out short retrace errors for the wavefront measurements for pre-measurement calibration to provide a system background image measurement for the reference surface.

2. The system of claim 1, wherein the tilt frequency is between about 0.1 Hz and 240 Hz.

3. The system of claim 1, wherein the angular tilt displacement of the reference surface is about 1-micron for every 1-inch of diameter of optical aperture of the reference surface.

4. The system of claim 1, wherein the interferometer system is a Fizeau interferometer.

5. A method of background subtraction in an interferometry measurement comprising:
providing an input wave from a light source with a directional axis;
splitting the input wave with a beam splitter;
receiving the split input wave at a reference surface;
tilting the reference surface relative to the input wave with an open loop piezoelectric tilt actuator at a tilt frequency to angularly oscillate the reference surface at a plurality of tilt angles relative to the input wave such that the reference surface is at a non-zero angle of incidence relative to the directional axis of the input wave, the tilt actuator controlled with a microcontroller;
obtaining a plurality of wavefront image measurements of the reference surface at the plurality of tilt angles at a detector, each of the wavefront image measurements comprising a fringe pattern comprising a plurality of interference fringes;
comparing the wavefront image measurements at the plurality of tilt angles to ascertain the concavity or convexity of the reference surface; and overlaying the plurality of wavefront measurements of the reference surface to subtract out short retrace errors for the wavefront image measurements from the plurality of interference fringes for pre-measurement calibration to provide a system background image measurement for the reference surface.

6. The method of claim 5, further comprising controlling the tilt angle of the tilt actuator using a microcontroller.

7. The method of claim 5, wherein the tilt frequency is between about 0.1 Hz and 10 Hz.

8. The method of claim 5, further comprising locating fringe centres in the fringe pattern wavefront measurements.

9. The method of claim 5, wherein the tilt angle is at an angular displacement of the reference surface of about 1-micron for every 1-inch of diameter of optical aperture of the reference surface.

10. The method of claim 5, further comprising simultaneously directing the split input wave at a surface-under-test.

11. The method of claim 10, further comprising performing a three-dimensional surface plot construction of the surface-under-test.

12. The method of claim 5, wherein overlaying the plurality of wavefront measurements comprises processing the fringe pattern of each wavefront measurement to locate and mark the centre of bright and dark fringes.

13. The method of claim 5, further comprising applying a blur filter to the plurality of wavefront measurements.

14. The method of claim 5, wherein obtaining a plurality of wavefront measurements of the reference surface further comprises applying an aperture mask to identify an area of measurement.

15. The method of claim 5, wherein the tilt angle of the tilt actuator is changed between wavefront image measurements.

16. The method of claim 5, wherein tilting the reference surface relative to the input wave increases or decreases the number of interference fringes in the fringe pattern.

17. A tilt stage for an interferometry system comprising:
  a housing for securing the tilt stage to the interferometer system;
  a pivoting mount coupled to the housing;
  an optical reference surface releasably secured in the pivoting mount;
  an open loop piezoelectric tilt actuator coupled to the pivoting mount configured to angularly oscillate the reference surface at a tilt frequency and at a plurality of tilt angles relative to an input wave and displace the pivoting mount and optical reference surface during image measurement such that the reference surface is at an oscillating non-zero angle of incidence relative to the directional axis of the input wave; and
  a microcontroller coupled to the tilt actuator for controlling the angular tilt displacement of the tilt actuator to control the tilt frequency of the tilt actuator.

18. The tilt stage of claim 17, wherein the tilt actuator is a piezoelectric actuator.

* * * * *